(12) United States Patent
Sanchez

(10) Patent No.: US 10,843,632 B2
(45) Date of Patent: Nov. 24, 2020

(54) ONE-PIECE FLOORBOARD STORAGE COMPARTMENT

(71) Applicant: Anthony & Kimberlee Sanchez Family Trust, Pleasanton, CA (US)

(72) Inventor: Anthony J. Sanchez, Pleasanton, CA (US)

(73) Assignee: Anthony & Kimberlee Sanchez Family Trust, Pleasanton, CA (US)

( * ) Notice: Subject to any disclaimer, the term of this patent is extended or adjusted under 35 U.S.C. 154(b) by 0 days.

(21) Appl. No.: 16/590,137

(22) Filed: Oct. 1, 2019

(65) Prior Publication Data

US 2020/0031288 A1 Jan. 30, 2020

Related U.S. Application Data

(63) Continuation-in-part of application No. 16/283,755, filed on Feb. 23, 2019, now Pat. No. 10,457,220.

(51) Int. Cl.
*B60R 7/04* (2006.01)
*B60N 3/04* (2006.01)

(52) U.S. Cl.
CPC ............... *B60R 7/04* (2013.01); *B60N 3/044* (2013.01); *B60N 3/048* (2013.01)

(58) Field of Classification Search
CPC ........... B60R 7/04; B60R 7/087; B60N 3/048; B60N 3/06
USPC .............................. 296/37.14, 37.8, 75, 97.23
See application file for complete search history.

(56) References Cited

U.S. PATENT DOCUMENTS

| | | | | |
|---|---|---|---|---|
| 4,211,447 A | * | 7/1980 | DiVincenzo | B60N 3/044 180/90.6 |
| 4,280,729 A | * | 7/1981 | Morawski | B60N 3/044 15/215 |
| 4,420,180 A | * | 12/1983 | Dupont | B60N 3/044 15/215 |
| 6,534,146 B1 | * | 3/2003 | Mentz, Jr. | B60N 3/044 15/215 |
| 7,455,342 B2 | * | 11/2008 | Lechkun | B60N 2/995 296/64 |
| 9,440,594 B1 | * | 9/2016 | Clamont Bello | B60R 11/00 |
| 10,783,726 B1 | * | 9/2020 | Samuel | G07C 9/00563 |
| 2009/0174224 A1 | * | 7/2009 | Takakura | B60R 13/083 296/193.07 |
| 2009/0243328 A1 | * | 10/2009 | Graves | B60N 3/06 296/75 |
| 2016/0284149 A1 | * | 9/2016 | Espig | B60R 9/055 |
| 2017/0291733 A1 | * | 10/2017 | Henderson | B65D 11/1873 |
| 2018/0015862 A1 | * | 1/2018 | Chavez Martinez | B60N 3/044 |
| 2019/0232847 A1 | * | 8/2019 | Kim | B60R 7/04 |
| 2019/0291606 A1 | * | 9/2019 | Hodgson | B60N 2/10 |
| 2020/0062158 A1 | * | 2/2020 | Schnur | B65D 25/04 |
| 2020/0062159 A1 | * | 2/2020 | Schnur | B60R 7/02 |

* cited by examiner

*Primary Examiner* — Jason S Morrow
(74) *Attorney, Agent, or Firm* — Gerald R. Prettyman

(57) ABSTRACT

Disclosed is a one-piece floorboard storage compartment (100) for a front passenger side floorboard of a vehicle comprising a lower tray (105) and upper tray (150) which may be one-piece and may be used on top of a floorboard basin (A) of a vehicle to conceal for an least one concealed valuable (315) within an inner compartment (240) between the lower tray (105) and the upper tray (150).

20 Claims, 8 Drawing Sheets

US 10,843,632 B2

ONE-PIECE FLOORBOARD STORAGE COMPARTMENT

CROSS-REFERENCE TO RELATED APPLICATION

This application is a Continuation in Part of, and claims the benefit of priority to U.S. Non-Provisional patent application Ser. No. 16/283,755 filed Feb. 23, 2019, titled "FLOORBOARD STORAGE COMPARTMENT," and having the same inventive entity.

STATEMENT REGARDING FEDERALLY SPONSORED RESEARCH OR DEVELOPMENT

Not Applicable

BACKGROUND OF THE INVENTION

Field of Invention

The invention relates generally to the field of storage against theft and more specifically to a storage compartment suitable for automotive use.

Description of Related Art

Portable technology has advanced and encouraged people to communicate, engage in business, and enhance entertainment. Portable technology has also encouraged people to travel with their technology. The relative high value of this technology, however, and its ease of conversion to cash, has also encouraged portable technology theft, aided by the disadvantage that some technology, notably laptop computers, are not as easy to keep out of sight as smaller portable technology. Consequently, the crime of breaking automobile windows for theft has increased.

SUMMARY OF THE INVENTION

Disclosed is a one-piece floorboard storage compartment (100) for a front passenger side floorboard of a vehicle comprising a floorboard basin (A), a floorboard left side (B), a floorboard right side (C), a firewall lower portion (D) bordering an engine compartment and a floorboard rear side (E) adjacent to a passenger seat (F); the one-piece floorboard storage compartment (100) comprises a lower tray (105) and upper tray (150) which comprise one-piece and may be used on top of a floorboard basin (A) of a vehicle to conceal for an least one concealed valuable (315) within an inner compartment (240) between the lower tray (105) and the upper tray (150).

The lower tray (105) comprises a lower tray front side (115) configured to lie parallel against the firewall lower portion (D) of a vehicle and comprising a flexible lower tray front hinge (420) configured as a bottom edge of the lower tray front side (115), and configured as a top edge of a lower tray bottom outer surface (110) configured for resting on a floorboard basin (A), and comprising a lower tray back edge (125) configured to extend the one-piece floorboard storage compartment (100) adjacent to the floorboard rear side (E) adjacent to a passenger seat (F), with a lower tray inner bottom surface (245) bordered between a lower tray left edge (135), and a lower tray right edge (140) and comprising an inner compartment (240) configured for concealing an least one concealed valuable (315).

The upper tray (150) comprises a flexible upper tray front hinge (415) configured as a top edge of the lower tray front side (115) and as a top edge of an upper tray front side (155), which comprises a bottom edge (190) to which is affixed an upper tray outer surface (180) comprising a waterproof and wear resistant material (205), with a flexible upper tray left inner hinge (405) affixed along a left side of the lower tray front side (115) and the upper tray outer surface (180), with an upper tray left side (165) affixed along the flexible upper tray left inner hinge (405), with the upper tray left side (165) having an upper tray left outer edge (335), and a flexible upper tray right inner hinge (410) affixed along a right side of the lower tray front side (115) and the upper tray outer surface (180), with a upper tray right side (170) affixed along the flexible upper tray right inner hinge (410), with the upper tray right side (170) having an upper tray right outer edge (340).

The upper tray (150) lifts angularly along the flexible upper tray front hinge (415) above the lower tray (105) while the a bottom edge (190) of the upper tray front side (155) may comprise an upper tray hinge line (185) between the upper tray front side (155) and the upper tray outer surface (180) allowing an upper tray lifting portion (320) of the upper tray (150) to lift angularly above the lower tray (105).

The one-piece floorboard storage compartment (100) may comprise a lower tray left alignment channel 220) along the lower tray left edge (135) for holding and aligning the upper tray left side (165) in and to the lower tray (105), and a lower tray right alignment channel (225) along the lower tray right edge (140) for holding and aligning the upper tray left side in and to the lower tray (105).

An at least one separation support (230) within the inner compartment (240) supports and levelly separates the upper tray (150) above a lower tray inner bottom surface (245) between a flexible lower tray front hinge (420) and a lower tray back edge (125).

The inner compartment (240) may include one or more of a plurality of a at least one separation support (230). The a lower tray inner bottom surface (245) which may comprise a slip-mitigating surface (260), a vibration absorbing material (265), and an at least one affixable divider (275).

To provide protection from the weather elements, the upper tray (150) may comprise one or more of a waterproof and wear resistant material (205), a plurality of channels and grooves (215), a fluid well (210), and an upper tray stiff support material (305).

DETAILED DESCRIPTION OF THE INVENTION

The one-piece floorboard storage compartment (100) when in use, rests on the floorboard basin (A), bordered towards the front of the vehicle by the firewall lower portion (D) bordering an engine compartment (as in a front-engine vehicle), and—towards the rear of the vehicle—by the floorboard rear side (E) in front of the passenger seat (F). To the left of the one-piece floorboard storage compartment (100) is the floorboard left side (B), which in a typical front-engine passenger vehicle often abuts against a transmission hump. To the right of the one-piece floorboard storage compartment (100) is the floorboard right side (C) which typically abuts against a passenger side door frame.

Figure 1:
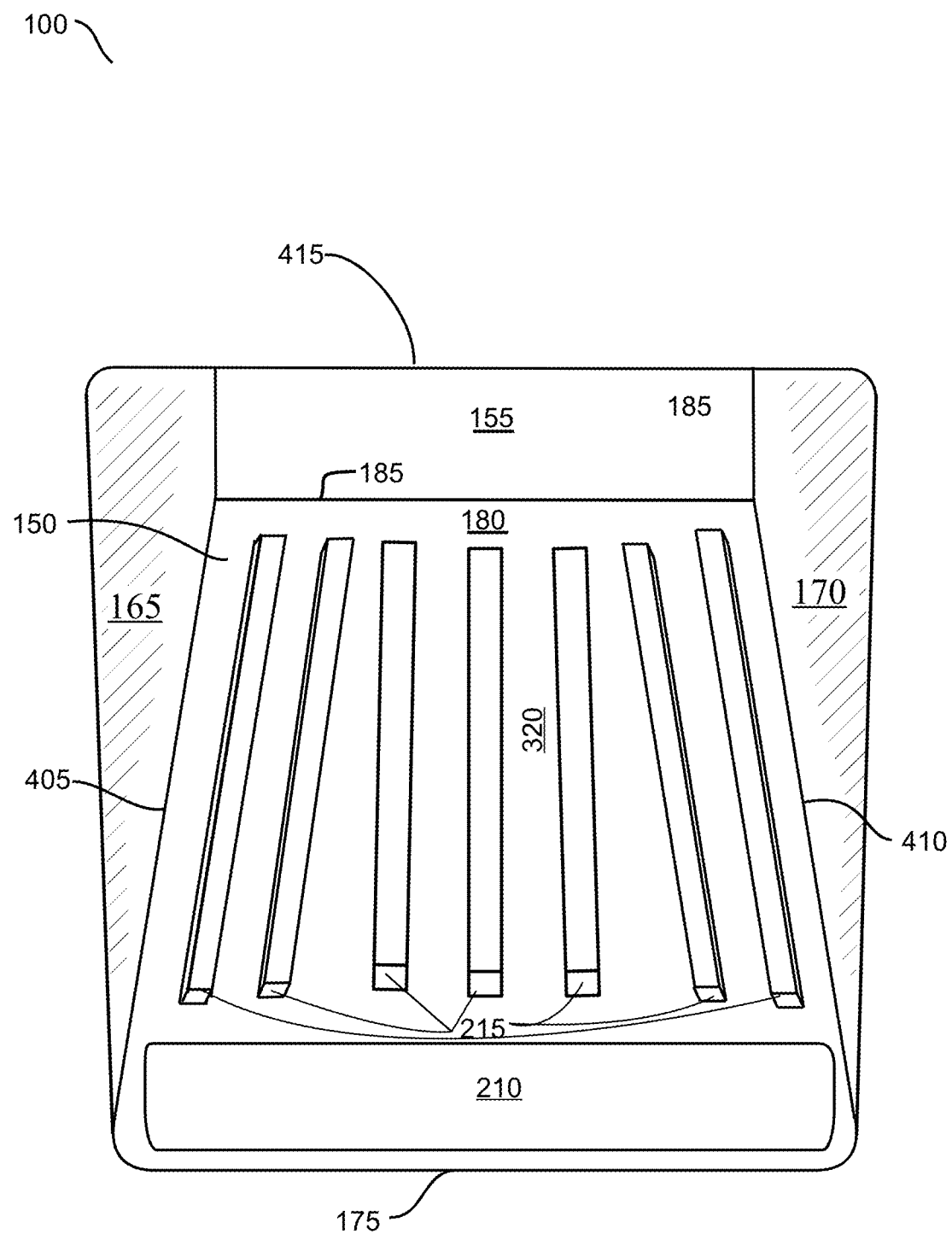
FIG. 1 shows a closed top perspective view of a one-piece floorboard storage compartment (100).

FIG. 1 shows a closed top perspective view of a one-piece floorboard storage compartment (100).

Shown in FIG. 1 are the closed one-piece floorboard storage compartment (100), an upper tray front side (155), an upper tray left side (165), an upper tray right side (170), an upper tray back edge (175), an upper tray outer surface (180), an upper tray hinge line (185), a flexible upper tray front hinge (415), a fluid well (210), a plurality of channels and grooves (215), a flexible upper tray left inner hinge (405), and a flexible upper tray right inner hinge (410).

When the one-piece floorboard storage compartment (100) is in place on the floorboard without any contents, the upper tray (150) is primarily in view with the upper tray 150) overlapping the lower tray (105) with the lower tray front side (115) against the firewall lower portion (D). As the one-piece floorboard storage compartment (100) is intended for concealing small personal items from theft, the upper tray (150) appears to be, and may be used as, an automotive floorboard floor mat.

The upper tray (150) may have an upper tray front side (155) affixed at a top edge to a flexible upper tray front hinge (415) which is affixed to a lower tray front side (115). See FIG. 3.

Attached to the side of the upper tray (150) are an upper tray left side (165), an upper tray right side (170). When the one-piece floorboard storage compartment (100) lacks concealed contents, the upper tray (150) may be lain flat against the lower tray (105) with the upper tray left side (165) and the upper tray right side (170) laid out and flat against the floorboard basis A and firewall lower portion (D).

When the one-piece floorboard storage compartment (100) contains concealed contents, the upper tray (150) lays above the lower tray (105) with the upper tray left side (165) and the upper tray right side (170) upright. See FIG. 2.

The one-piece floorboard storage compartment (100) may have structures in and near an upper tray outer surface (180) for protecting the floorboard basis (A) from water and other outside matter. The one-piece floorboard storage compartment (100) may comprise a vinyl polymer, textile material, carpet, other materials used for vehicle floormats, or any materials suitable for the purpose. The structures may include a fluid well (210), and a plurality of channels and grooves (215). Located near the upper tray back edge (175), the fluid well (210) retains water and other outside matter. The plurality of channels and grooves (215), which are generally centered on the upper tray (150) direct water and other outside materials towards the fluid well (210).

To assure that if these structures encounter water and other matter from outside the vehicle without leakage or damage, the one-piece floorboard storage compartment (100) and any of it's structures may be made or formed from any material capable encountering water and other outside matter without damage. In general, the material may be one or more of water-resistant, water-proof, wear resistant, and damage-resistant. These materials may be metal, wood, plastic, a natural material, a composite of two of these, a composite of three of these, or a composite of all four. The one-piece floorboard storage compartment (100) and any of its structures may be made or formed of rubber, vinyl, polyvinyl chloride, textile material, carpet, other materials used for vehicle floormats, or any materials suitable for the purpose. The one-piece floorboard storage compartment (100) may cut from stock rolled material, sheet material, pressed, or extruded.

Also present on the upper tray (150) may be an upper tray hinge line (185). The upper tray hinge line (185) runs across the upper tray (150) to allow the upper tray (150) to lift relative to the lower tray (105). The upper tray hinge line (185) may demarcate the upper tray front side (155) from the upper tray outer surface (180).

The upper tray hinge line (185) may be a 'living' hinge, i.e., made by (a) flexing the upper tray (if made from certain plastics) along the upper tray hinge line (185) immediately after forming, (b) partially thinning the upper tray (if made from vinyl or rubber) along the upper tray hinge line (185). (c) cutting a series of close, narrow, parallel lines in the upper tray along the upper tray hinge line (185), or any method of allowing the upper tray (150) to lift relative to the lower tray (105).

The upper tray hinge line (185) may be a hinge comprised of a leaf affixed to the upper tray (150) with another leaf affixed to the lower tray (105), and a knuckle and pin connecting the two leaves. The upper tray hinge line (185) may be one or more integrated straps affixing the lower tray (105) to the upper tray (150). Any form of one or more upper tray hinge line (185) may be used to allow the upper tray lifting portion (320) of the upper tray (150) to lift angularly above the lower tray (105).

Figure 2:
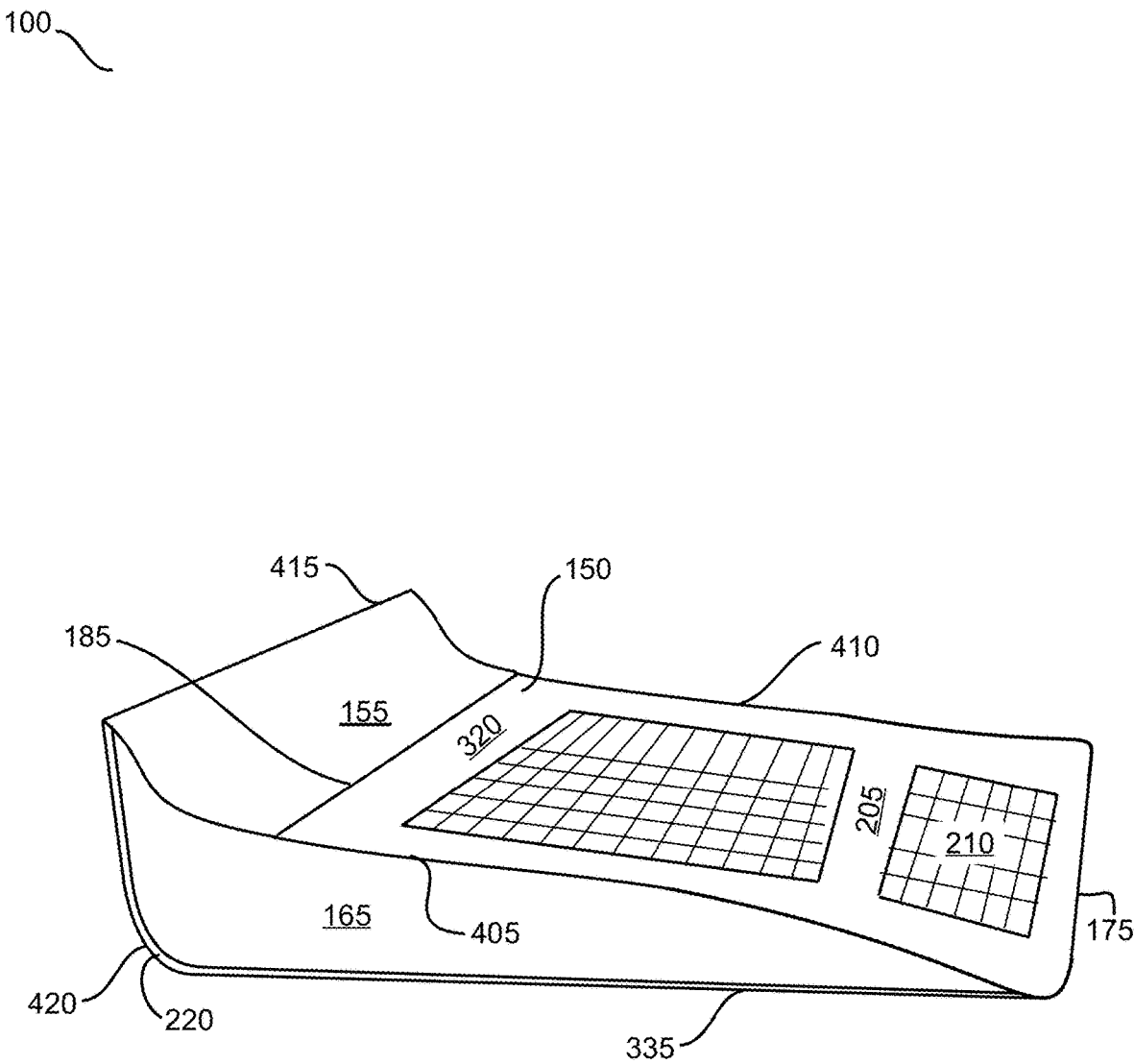
FIG. 2 shows closed left perspective view of a one-piece floorboard storage compartment (100).

FIG. 2 shows closed left perspective view of a one-piece floorboard storage compartment (100).

Shown in FIG. 2 are the closed one-piece floorboard storage compartment (100), a lower tray (105), a flexible lower tray front hinge (420), a lower tray back edge (125), a lower tray left edge (135), an upper tray (150), an upper tray front side (155), an upper tray left side (165), an upper tray right side (170), an upper tray back edge (175), an upper tray outer surface (180), a fluid well (210), a lower tray left alignment channel (220), a flexible upper tray left inner hinge (405), and a flexible upper tray right inner hinge (410).

The upper tray front side (155) may project generally parallel to the lower tray front side (115) (which is hidden in this view). To aid in concealing that the floorboard storage compartment is more than a floor mat, the upper tray front side (155) may lie parallel to within one-half inch to the lower tray front side (115)

When the one-piece floorboard storage compartment (100) contains concealed contents, the upper tray (150) lays above the lower tray (105) with the upper tray left side (165) and the upper tray right side (170) upright. The upper tray left side (165) may then be placed in the lower tray left alignment channel (220) for holding and aligning the upper tray left side (165) in and to the lower tray (105).

Also shown in FIG. 2 is an upper tray back edge (175). As shown in FIG. 2, the upper tray back edge (175) extends over the lower tray back edge (125, see FIG. 3) which aids protecting the at least one concealed valuable (315) within the inner compartment (shown in another drawing), and to aid that the one-piece floorboard storage compartment (100) as merely an automotive floor mat.

Also shown in FIG. 2 is an upper tray left side (165) which is affixed to the upper tray (150) via a flexible upper tray left inner hinge (405)). The upper tray left side (165) extends from along the left edge of the upper tray (150). i.e., the flexible upper tray left inner hinge (405) to support the upper tray (150) (in conjunction with support within the inner compartment) and to provide concealment of any contents within the inner compartment (240). The upper tray left side (165) may be made or formed of metal, wood, rubber, plastic, or a composite of two of these, or a composite of all three. The plastic material may comprise a vinyl polymer, a polyethylene, or any material capable of supporting the upper tray (150) and to provide concealment of any contents within the inner compartment (240).

Figure 3:
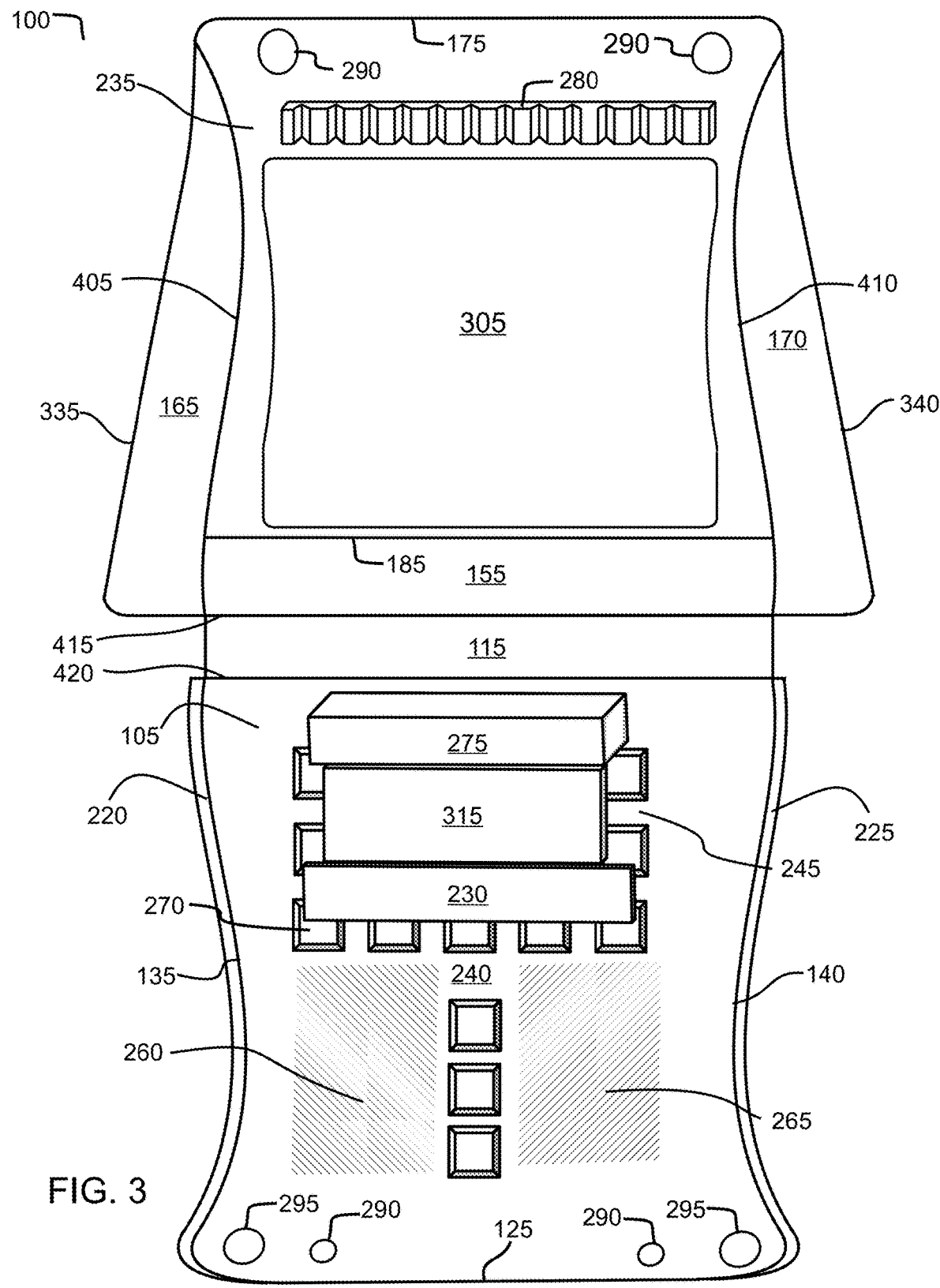
FIG. 3 shows an underside view of an upper tray (150) with an inside view of an attached lower tray (105).

FIG. 3 shows an underside view of an upper tray (150) with an inside view of an attached lower tray (105).

Shown in FIG. 3 are an upper tray left side (165), an upper tray right side 170), an upper tray back edge (175), an upper tray hinge line (185), a lower tray left alignment channel (220), a lower tray right alignment channel (225), an upper tray inner surface (235), a plurality of side-by-side ridges (280), an at least two magnets (290), an upper tray stiff support material (305), an upper tray left outer edge (335), an upper tray right outer edge (340), a flexible upper tray left inner hinge (405), a flexible upper tray right inner hinge (410), and a flexible upper tray front hinge (415).

As shown in FIG. 3, the upper tray underside is at the top of the page, with the upper tray back edge (175) at the top of the page. This view places the upper tray left side (165) on the left side of the page, and the upper tray right side (170) on the right side of the page.

To the left side of the lower tray (105) is a lower tray left alignment channel (220), while to the right side of the lower tray (105) is a lower tray right alignment channel (225). When the one-piece floorboard storage compartment (100) contains concealed contents, the upper tray (150) lays above the lower tray (105) with the upper tray left side (165) and the upper tray right side (170) upright. The upper tray left side (165) may then be placed in the lower tray left alignment channel (220) to hold and align the upper tray left side (165) in proximity to the lower tray (105), and the upper tray right side (170) in the lower tray right alignment channel (220) to hold and align the upper tray left side (165) in proximity to the lower tray (105).

Below the upper tray back edge (175) at the top of the page are optional items, a plurality of side-by-side ridges (280) and an at least two magnets (290). The plurality of side-by-side ridges (280) on the upper tray inner surface (235) provide a stand-off function for the upper tray (150) at the lower tray back edge (125). The plurality of side-by-side ridges (280) may be positioned between one-half inch and four inches from the upper tray back edge (175).

The at least two magnets (290) are affixed to the upper tray inner surface (235) at the upper tray back edge (175) to help center and hold the upper tray (150) in place when the upper tray (150) is closed onto of the lower tray (105). i.e., they magnetically couple to an at least two magnets (290) affixed to the lower tray inner bottom surface (245) at the lower tray back edge (125) to secure closure of the upper tray (150) to the lower tray (105).

Shown below the plurality of side-by-side ridges (280) in the mid-section of the upper tray inner surface is an upper tray stiff support material (305). The upper tray stiff support material (305) may extend from the upper tray left side (165) to the upper tray right side (170) and between the upper tray hinge line (185) and the upper tray back edge (175).

When constructed from a stiff support material, the upper tray stiff support material (305) provides stiffness to the upper tray (150), which then adds protection to the contents of the inner compartment (shown in another drawing), and may provide for portability of the one-piece floorboard storage compartment (100).

The upper tray stiff support material (305) may be made of metal, wood, plastic, a composite of two of these, a composite of all three, or any material capable of providing stiffness to the upper tray (150). The upper tray stiff support material (305) may be capable of supporting at least 15 pounds.

Directly below (on FIG. 3) the upper tray stiff support material (305) is the underside of the upper tray front side (155), with the lower tray front side (115) below the underside of the upper tray front side (155).

Directly above (on FIG. 3) the underside of the lower tray front side (115) is a flexible upper tray front hinge (415), which can be noted to be co-linear with the (top) edges of the upper tray left side (165) which has an upper tray left outer edge (335), and an upper tray right side (170) which has a upper tray right outer edge (340). In this configuration, the flexible upper tray front hinge (415) is a demarcation between the upper tray (150) and the lower tray (105) when the one-piece floorboard storage compartment (100) is placed on a floorboard.

The flexible upper tray front hinge (415) also serves as a demarcation between the visible portion of the one-piece floorboard storage compartment (100), and the lower tray front side (115) which rests against the firewall lower portion (D) when the one-piece floorboard storage compartment (100) is placed on a floorboard.

The flexible upper tray front hinge (415) may be a 'living' hinge, i.e., made by (a) flexing the upper tray (if made from certain plastics) along the location of the flexible upper tray front hinge (415) immediately after forming, (b) partially thinning the upper tray (if made from vinyl or rubber) along the location of the flexible upper tray front hinge (415), (c) cutting a series of close, narrow, parallel lines in the upper tray along the location of the flexible upper tray front hinge (415), or any method of allowing the flexible upper tray front hinge (415) to flex for the upper tray (150) to move relative to the lower tray front side (115).

The flexible upper tray front hinge (415) may be a hinge comprised of a leaf affixed to the upper tray (150) with another leaf affixed to the lower tray front side (115), and a knuckle and pin connecting the two leaves. The flexible upper tray front hinge (415) may be one or more integrated straps affixing the upper tray (150) to the lower tray front side (115). Any form of one or more flexible upper tray front hinge (415) may be used to allow the flexible upper tray front hinge (415) to flex for the upper tray (150) to move relative to the lower tray front side (115).

Between the lower tray front side (115) and the rest of the lower tray is a flexible lower tray front hinge (420), provides for an appealing and convincing view of the one-piece floorboard storage compartment (100). The flexible lower tray front hinge (420) has the same properties and fabrication characteristics as the flexible upper tray front hinge (415).

Also shown in FIG. 3 are a lower tray (105), a lower tray back edge (125), a lower tray left edge (135), a lower tray right edge (140), an at least one separation support (230), an inner compartment 240), a lower tray inner bottom surface (245), and an at least one concealed valuable (315).

As shown in FIG. 3, the inner compartment (240) lies within the lower tray (105). Along the lower tray back edge (125), an least one floorboard affixment port (295) may be used to affix the one-piece floorboard storage compartment (100) to the floorboard basin (A).

Also along the lower tray back edge (125), a set of an at least two magnets (290) may be used to magnetically couple the lower tray (105) to a set of an at least two magnets (290) on the upper tray (150), which are shown near the top of FIG. 3.

Shown along three sides of the inner compartment (240), an at least one separation support (230) serves to support the upper tray (150) onto the lower tray (105). The an at least one separation support (230) may support and separate the upper tray (150) at a distance of at least one-half inch but not more than five inches above the lower tray inner bottom surface (245).

Within the inner compartment (240), the lower tray inner bottom surface (245) may use various surfaces for safely containing the at least one concealed valuable (315).

The lower tray inner bottom surface (245) may have a matrix of padded squares arranged in a square grid pattern (270) to cushion the at least one concealed valuable (315) from vibration and movement. Additional pieces of the at least one separation support (230) or an at least one affixable divider (275) may be placed on the matrix of padded squares arranged in a square grid pattern (270) for dividing the inner compartment (240) into a plurality of inner compartments and to cushion the at least one concealed valuable (315). The matrix of padded squares arranged in a square grid pattern (270) may be configured for use an at least one separation support (230) having a portion cut-out along the bottom edges of the an at least one separation support 1230) for fitting over the matrix of padded squares arranged in a square grid pattern (270) within an inner compartment (240).

A slip-mitigating surface (260) may be used to lessen movement of the at least one concealed valuable (315) within the inner compartment. The slip-mitigating surface (260) may substitute for the matrix of padded squares arranged in a square grid pattern (270). The slip-mitigating surface (260) may comprise a rough, i.e., friction causing, surface. The slip-mitigating surface (260) may comprise a surface having an adhesion affect.

A vibration absorbing material (265) may be used to lessen vibration transfer to the at least one concealed valuable (315) within the inner compartment. The vibration absorbing material (265) may substitute for the matrix of padded squares arranged in a square grid pattern (270). The vibration absorbing material (265) may comprise a compressible material formed into a matrix of padded squares arranged in a square grid pattern (270) on the lower tray inner bottom surface (245). The vibration absorbing material (265) may comprise materials comprising air trapped within a material, or bonded to the material, including but not limited to bubble packing ('wrap'), polystyrene-foam, polyurethane foam, ethylene-vinyl acetate (EVA) foam, copolymers of ethylene and vinyl acetate, i.e., polyethylene-vinyl acetate (PEVA), low-density polyethylene (LDPE) foam, polyethylene (PE), nitrile rubber (NBR) foam, copolymers of acrylonitrile (ACN) and butadiene, polychloroprene foam ('neoprene'), etc.

The lower tray inner bottom surface (245) may comprise a scratch minimizing surface, such as cloth, a plastic, an elastomer, or any scratch minimizing surface.

Figure 4:
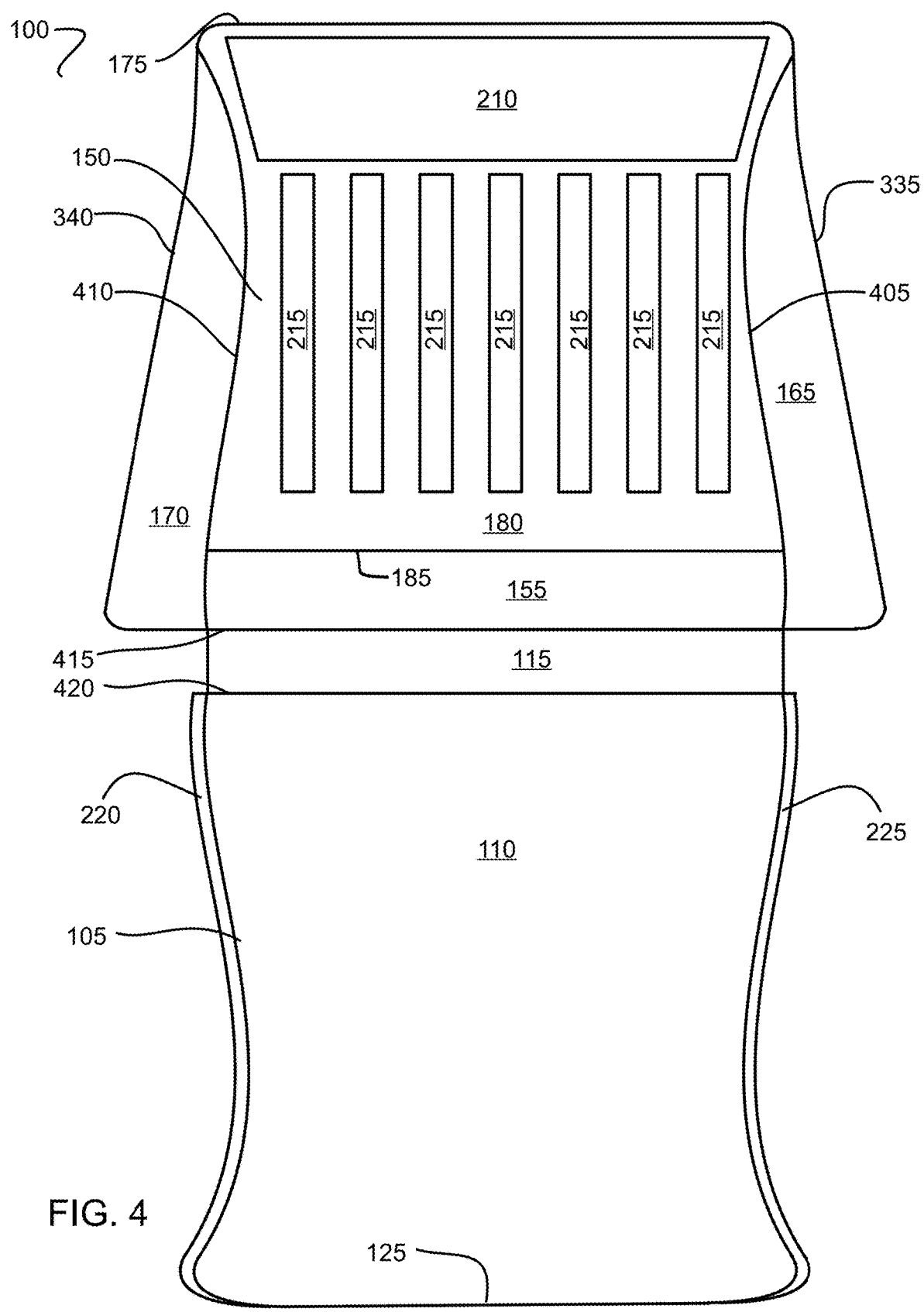
FIG. 4 shows a top view of an upper tray (150) with a bottom view of a lower tray (105).

FIG. 4 shows a top view of an upper tray (150) with a bottom view of a lower tray (105). Shown in FIG. 4 are the an upper tray back edge (175), a fluid well (210), a plurality of channels and grooves (215), a flexible upper tray right inner hinge (410), a flexible upper tray left inner hinge (405), an upper tray right side (170), an upper tray left side (165), an upper tray front side (155), a lower tray front side (115), a lower tray left alignment channel (220), a lower tray right alignment channel (225), a flexible upper tray front hinge (415), a flexible lower tray front hinge (420) and lower tray bottom outer surface (110).

As the bottom of the lower tray bottom outer surface (110) rests against the floorboard, the lower tray bottom outer surface (110) is typically flat. In this view are shown the backview of the lower tray left alignment channel (220) and the lower tray right alignment channel (225), i.e., also flat.

Figure 5:
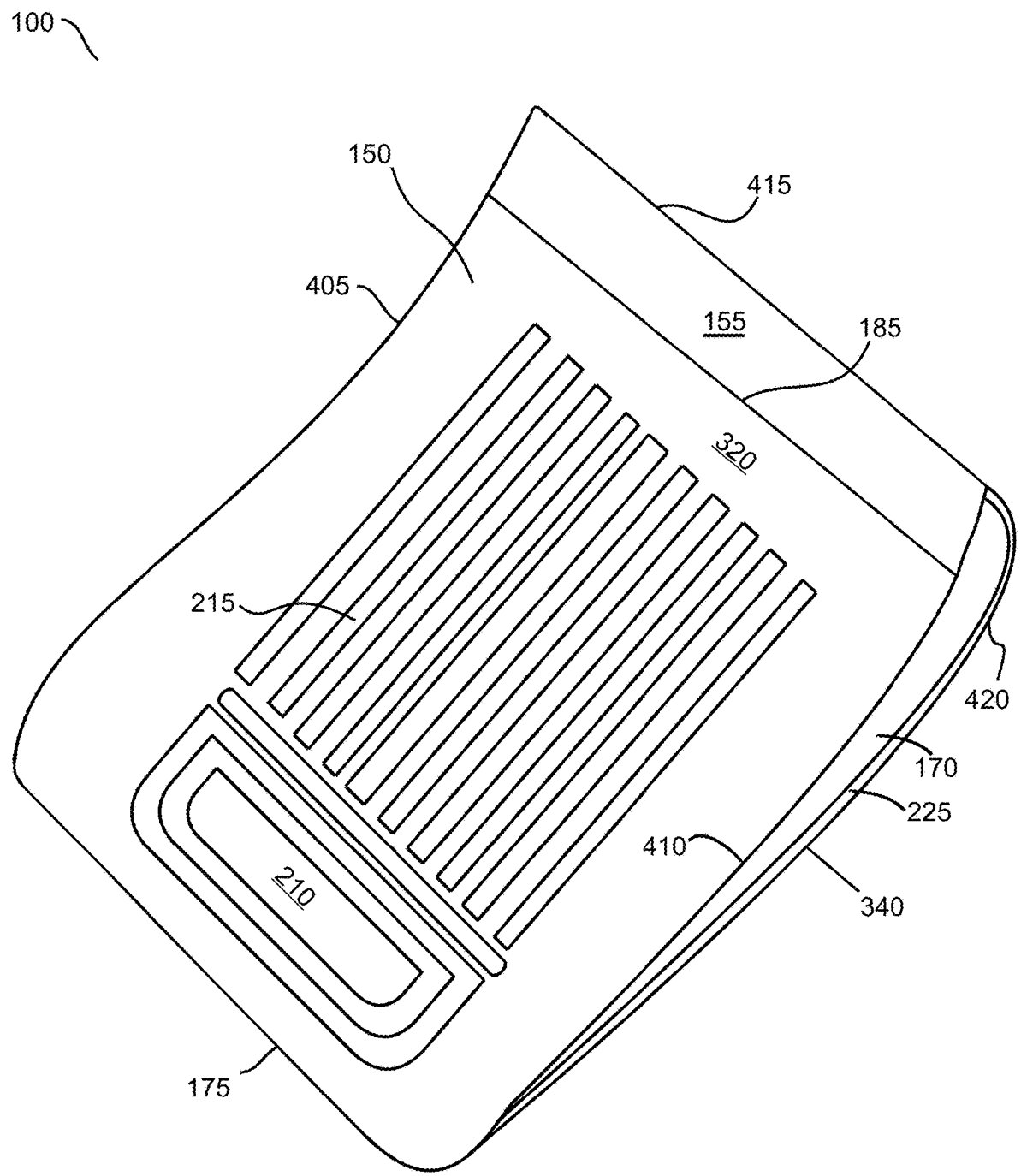
FIG. 5 shows a top right perspective view of an upper tray and attached lower tray (105).

FIG. 5 shows a top right closed perspective view of an upper tray and attached lower tray (105).

Shown in FIG. 5 are a one-piece floorboard storage compartment (100), an upper tray front side (155), an upper tray right side (170), an upper tray back edge (175), an upper tray outer surface (180), an upper tray hinge line (185), the flexible upper tray left inner hinge (405), and the flexible upper tray right inner hinge (410).

As shown in FIG. 5, the upper tray (150) has a upper tray lifting portion (320), which lifts angularly above the lower tray (105) along the upper tray hinge line (185), which runs between the flexible upper tray left inner hinge (405), and the flexible upper tray right inner hinge (410).

Also shown is a lower tray right alignment channel (225) along the lower tray right edge (140) for holding and aligning the upper tray right side (170) in and to the lower tray (105).

The upper tray (150) may lift partially. i.e., to an angle in the range of 45 degrees to 60 degrees, which (1) generally provides sufficient clearance for a user to place the at least one concealed valuable (315) within the inner compartment (240), or to remove them, and (2) provides for a sufficient length of the one-piece floorboard storage compartment (100) while not causing frustration with a low dashboard.

As shown FIG. 2 and FIG. 5 the portion of the one-piece floorboard storage compartment (100) closer to the firewall, i.e., at the flexible upper tray left inner hinge (405) has a height higher than the portion near the seats, i.e., near the upper tray back edge (175). As such, the flexible upper tray left inner hinge (405), and the flexible upper tray right inner hinge (410) may have a curvilinear profile, a linear profile, or a combination curvilinear-linear profile.

FIG. 5 also shows on the upper tray outer surface (180), a plurality of channels and grooves (215), for directing fluids as might drip from footwear, into a fluid well (210).

As shown in FIG. 5, the curved lateral profile of the upper tray left side (165), and the upper tray right side (170) provide an aesthetic appeal to the one-piece floorboard storage compartment (100).

Figure 6:
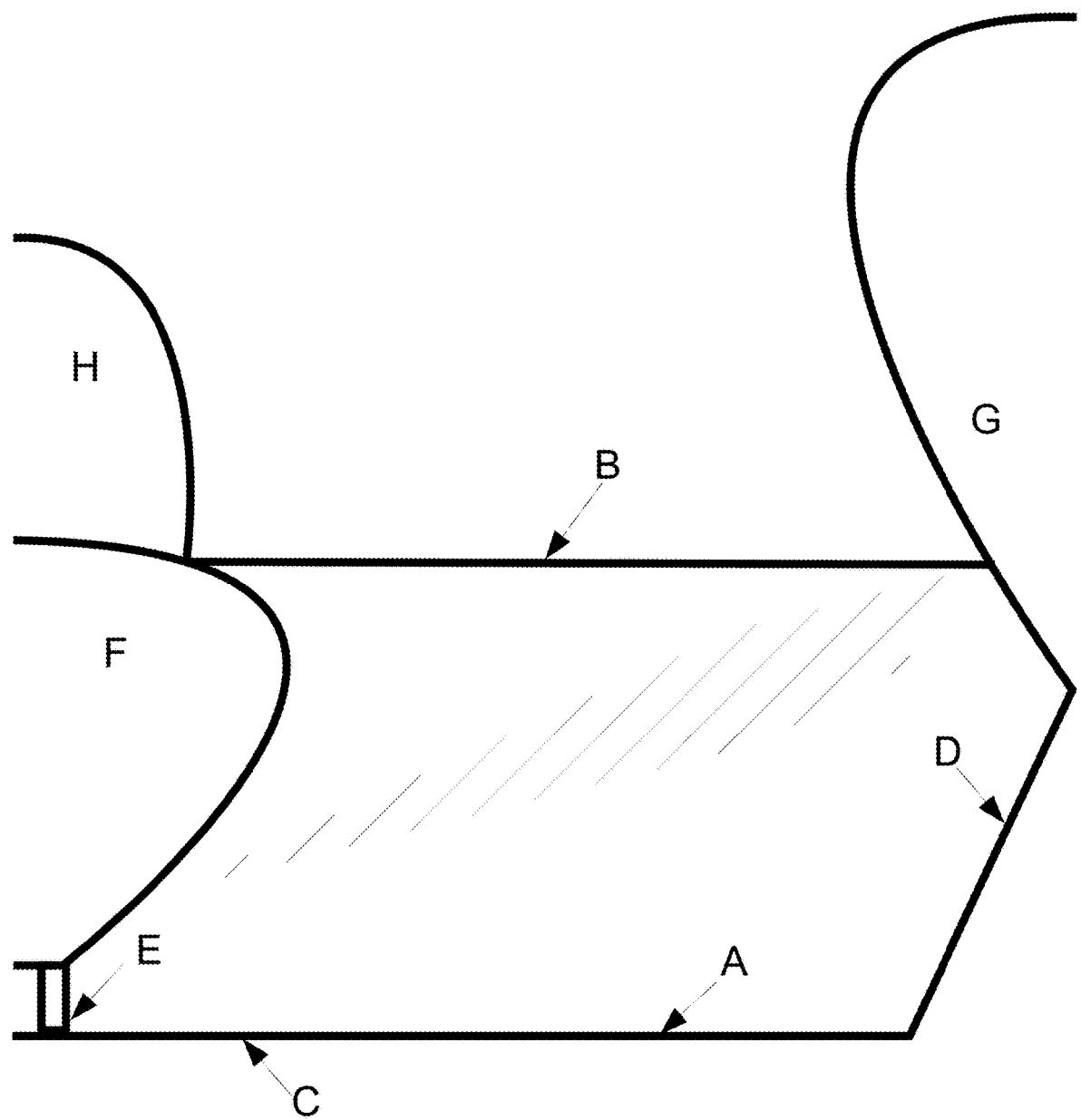
FIG. 6 shows a partial view of an automobile front passenger seat compartment.

FIG. 6 shows a partial view of a front passenger side floorboard in an automobile passenger compartment.

Shown in FIG. 6 are a floorboard basin (A), a floorboard left side (B), a floorboard right side (C), a firewall lower portion (D), a floorboard rear side (E), a passenger seat (F), a dashboard (G), and an inter-seat center console (H).

Different automobiles may vary in the precise spatial positioning of these components.

The front passenger seat compartment floorboard basin A may be lower, i.e., closer to roadway, than the passenger door, which may affect the location of the floorboard right side (C), and thus the profile and height and the lower tray right side (145).

The floorboard left side (B) may borders a center transmission hump, although certain vehicles, particularly, front drive versions, lack a transmission hump. Similarly, some vehicles lack a center console (H) between the front seats.

The firewall lower portion (D) may have a different angle to the front passenger seat compartment floorboard basin (A) which may affect the angle of the lower tray front side (115), the upper tray front side (155), or both.

The dashboard (G) may be lower or higher above the floorboard basin A, which may affect the length of the one-piece floorboard storage compartment (100), or the angle to which the upper tray lifting portion (320) lifts relative the lower tray (105).

The dashboard (G) may have a flatter profile. Regardless, FIG. 6 presents a sufficient spatial orientation for use of the one-piece floorboard storage compartment (100).

Figure 7:
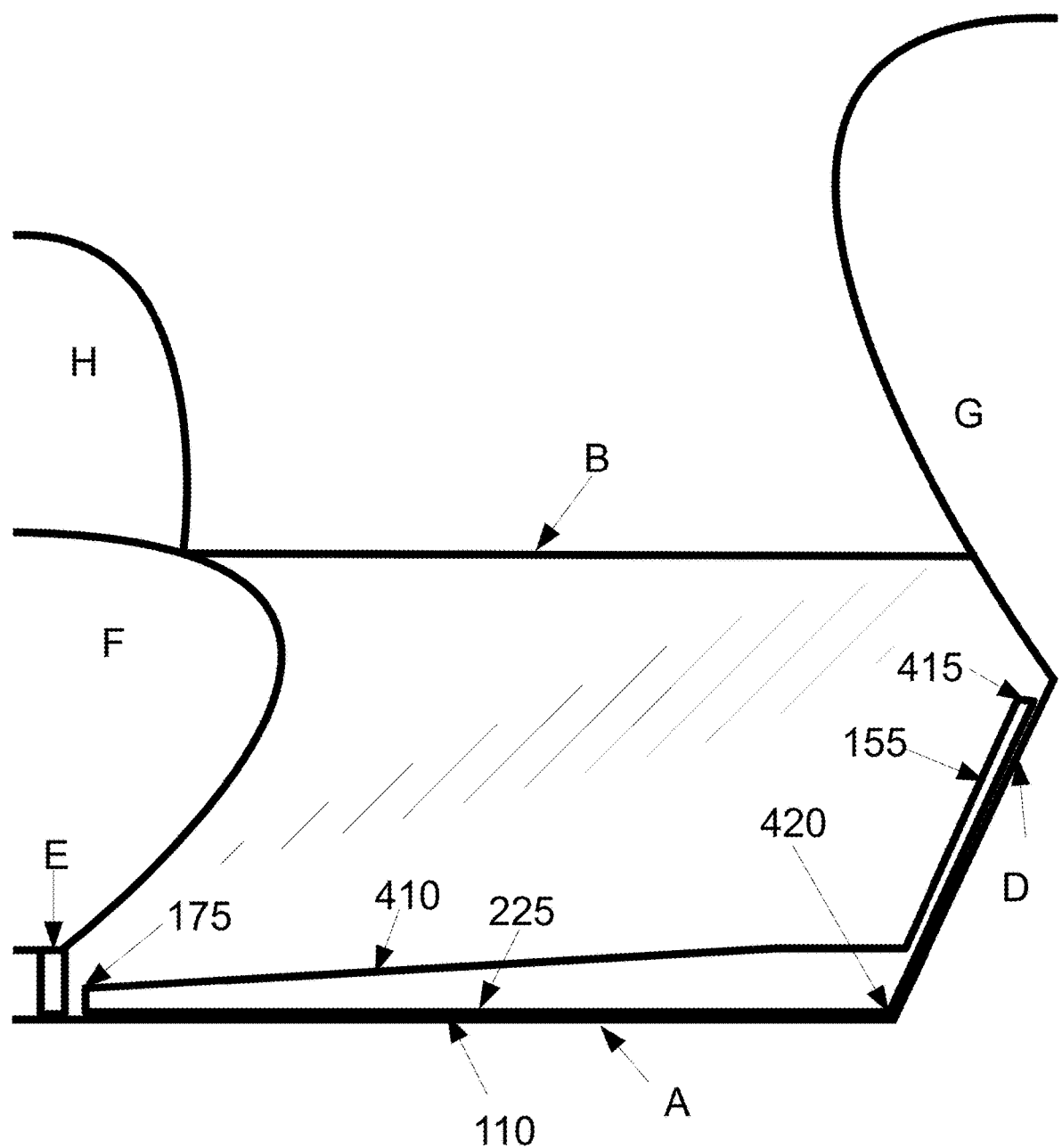
FIG. 7 shows a closed right plan view of a one-piece floorboard storage compartment (100) in place within the FIG. 6 partial view of an automobile front passenger seat compartment.

FIG. 7 shows a closed right plan view of a one-piece floorboard storage compartment (100) in place within the FIG. 6 partial view of an automobile front passenger seat compartment.

Shown in FIG. 7 are the one-piece floorboard storage compartment (100), a lower tray bottom outer surface (110), an upper tray front side (155), a lower tray back edge (125), a lower tray right edge (140), a flexible upper tray right inner hinge (410), a flexible upper tray front hinge (415), a flexible lower tray front hinge (420), a floorboard basin (A), a floorboard left side (B), a firewall lower portion (D), a floorboard rear side (E), a passenger seat (F), a dashboard (G), and an inter-seat center console (H).

As shown in FIG. 6, the upper tray back edge (175) may extend to within and less than one inch from the floorboard rear side (E) bordered by a passenger seat (F), while the an upper tray front side (155) rests atop the lower tray, which is adjacent to the a firewall lower portion (D).

Figure 8:
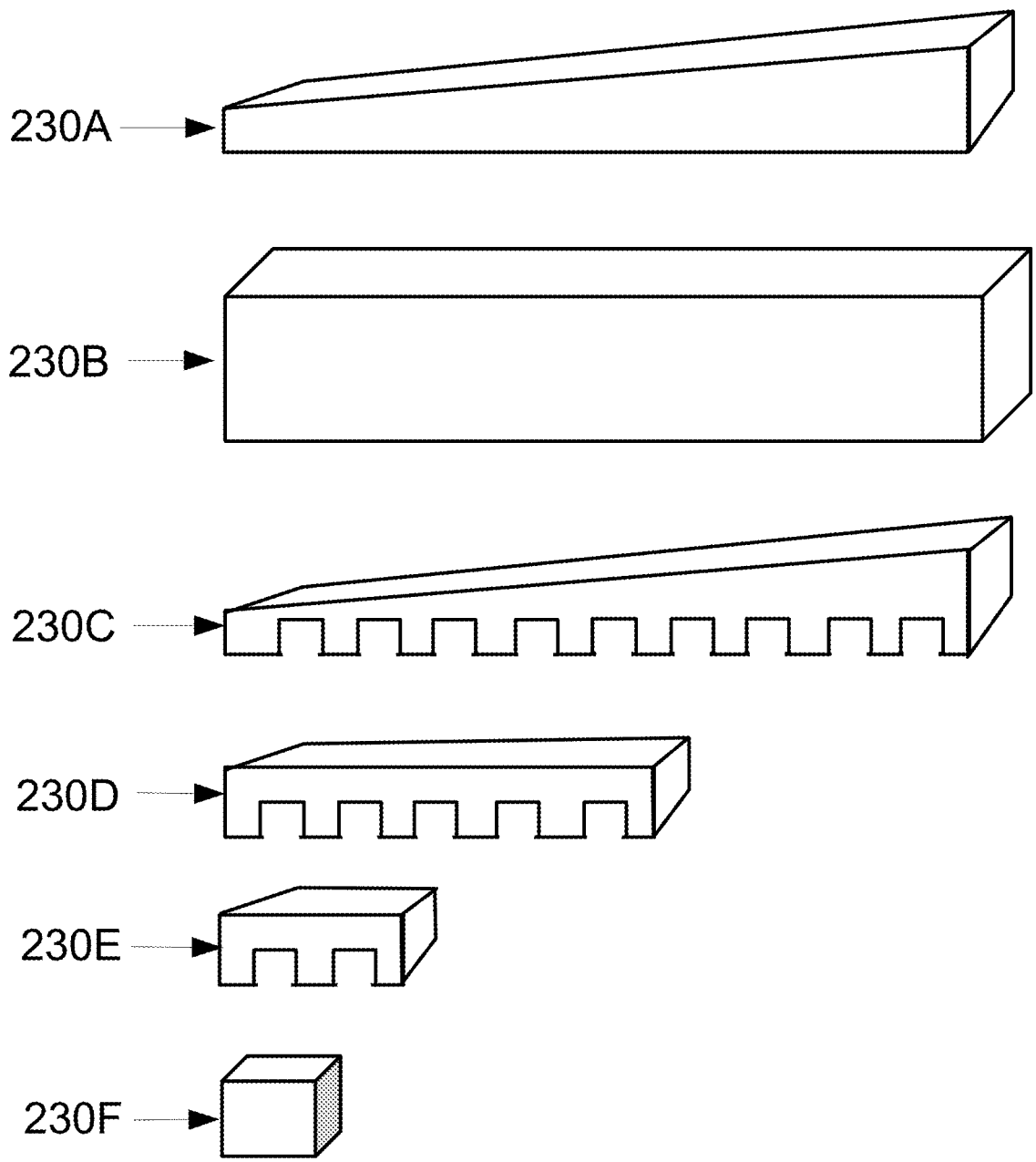
FIG. 8 shows multiple configurations of an at least one separation support (230) with a portion cut-out along the bottom edges for fitting over the matrix of padded squares arranged in a square grid pattern (270) within an inner compartment (240).

FIG. 8 shows multiple configurations of the at least one separation support (230) with a portion cut-out along the bottom edges for fitting over the matrix of padded squares arranged in a square grid pattern (270) within an inner compartment (240).

The at least one separation support (230) serves to (1) support the upper tray (150) above the lower (105), (2) hold an at least one concealed valuable (315) in place in the inner compartment (240), and (3) separate an at least one concealed valuable from contact with any other an at least one concealed valuable an at least one concealed valuable (315). The at least one separation support (230) may also be used as an at least one affixable divider (275) for dividing the inner compartment (240) into a plurality of inner compartments.

An at least one separation support (230A) is an incline plane version with a length to provide for a sloping support of the upper tray (150) above the lower tray (105), as might be used along the lower tray left edge (135) and the lower tray right edge (140).

An at least one separation support (230B) is double height version with a length for use along the front side of the lower tray (105).

An at least one separation support (230C) is an incline plane model with side to side cut-outs for fitting over the matrix of padded squares arranged in a square grid pattern (270).

An at least one separation support (230D) is a flat version with side to side cut-outs for fitting over the matrix of padded squares arranged in a square grid pattern (270).

An at least one separation support (230E) is a shorter flat version with side to side cut-outs for fitting over the matrix of padded squares arranged in a square grid pattern (270) for use to hold an at least one concealed valuable (315) in place in the inner compartment (240), and separate an at least one concealed valuable from contact with any other at least one concealed valuable (315).

An at least one separation support 230E is a small flat version without side to side cut-outs for use to support the upper tray (150) above the lower (105) and separate an at least one concealed valuable from contact with any other an at least one concealed valuable an at least one concealed valuable (315).

These descriptions and drawings are embodiments and teachings of the disclosure. All variations are within the spirit and scope of the disclosure. This disclosure is not to be considered as limiting the claims to only the embodiments illustrated or discussed. Certain changes can be made in the subject matter without departing from the spirit and the scope of this invention. Changes are possible within the scope of this invention. Each structure or element recited in any claim also refers to all equivalent structures or elements. The following claims are intended to cover the invention as broadly as possible in whatever form it may be used.

I claim:

1. A one-piece floorboard storage compartment (100) for a front passenger side floorboard of a vehicle comprising a floorboard basin (A), a floorboard left side (B), a floorboard right side (C), a firewall lower portion (D) bordering an engine compartment and a floorboard rear side (E) adjacent to a passenger seat (F), wherein the one-piece floorboard storage compartment (100) comprises:
   a lower tray (105) comprising
      a lower tray front side (115) configured to lie parallel against the firewall lower portion (D) of a vehicle and comprising
      a flexible lower tray front hinge (420) configured as a bottom edge of the lower tray front side (115), and configured as a top edge of
      a lower tray bottom outer surface (110) configured for resting on a floorboard basin (A), and comprising a lower tray back edge (125) configured to extend the one-piece floorboard storage compartment (100) adjacent to a passenger seat (F), with
      a lower tray inner bottom surface (245) bordered between a lower tray left edge (135), and a lower tray right edge (140) and comprising an inner compartment (240) configured for concealing an least one concealed valuable (315),
   an upper tray (150) comprising
      a flexible upper tray front hinge (415) configured as a top edge of the lower tray front side (115) and as a top edge of an upper tray front side (155), which comprises a bottom edge (190) to which is affixed to an upper tray outer surface (180) comprising a waterproof and wear resistant material (205),
      a flexible upper tray left inner hinge (405) affixed along a left side of the lower tray front side (115) and the upper tray outer surface (180), with an upper tray left side (165) affixed along the flexible upper tray left inner hinge (405), with the upper tray left side (165) having an upper tray left outer edge (335),
      a flexible upper tray right inner hinge (410) affixed along a right side of the lower tray front side (115) and the upper tray outer surface (180), with a upper tray right side (170) affixed along the flexible upper tray right inner hinge (410), with the upper tray right side (170) having an upper tray right outer edge (340).

2. The one-piece floorboard storage compartment (100) of claim 1 further comprising a lower tray left alignment channel (220) along the lower tray left edge (135) for holding and aligning the upper tray left side (165) in and to the lower tray (105), and a lower tray right alignment channel (225) along the lower tray right edge (140) for holding and aligning the upper tray right side (170) in and to the lower tray (105).

3. The one-piece floorboard storage compartment (100) of claim 1 further comprising a plurality of channels and grooves (215) on top of the upper tray outer surface (180).

4. The one-piece floorboard storage compartment (100) of claim 1 wherein the lower tray inner bottom surface (245) comprises a slip-mitigating surface (260).

5. The one-piece floorboard storage compartment (100) of claim 1 wherein the lower tray inner bottom surface (245) comprises a vibration absorbing material (265).

6. The one-piece floorboard storage compartment (100) of claim 5 wherein the vibration absorbing material (265) comprises a compressible material.

7. The one-piece floorboard storage compartment of (100) of claim 1 wherein the lower tray inner bottom surface (245) comprises a scratch minimizing surface.

8. The one-piece floorboard storage compartment of (100) of claim 1 further comprising an at least one affixable divider (275) for dividing the inner compartment (240) into a plurality of inner compartments.

9. The one-piece floorboard storage compartment (100) of claim 1 wherein the upper tray (150) further comprises an upper tray hinge line (185) between the upper tray front side (155) and the upper tray outer surface (180).

10. The one-piece floorboard storage compartment (100) of claim 1 further comprising an upper tray lifting portion (320) configured to lift angularly above lower tray (105) along an upper tray hinge line (185).

11. The one-piece floorboard storage compartment (100) of claim 1 wherein the one-piece floorboard storage compartment (100) comprises a vinyl polymer.

12. The one-piece floorboard storage compartment (100) of claim 1 wherein the upper tray (150) further comprises an upper tray stiff support material (305).

13. The one-piece floorboard storage compartment (100) of claim 12 wherein the upper tray stiff support material (305) provides stiffness to the upper tray (150) and is capable of supporting at least 15 pounds.

14. The one-piece floorboard storage compartment (100) of claim 1 wherein the upper tray (150) comprises an upper tray inner surface (235) comprising a plurality of side-by-side ridges (280) and positioned between one-half inch and four inches from an upper tray back edge (175).

15. The one-piece floorboard storage compartment (100) of claim 1 further comprising an at least two magnets (290) affixed to an upper tray inner surface (235) at an upper tray back edge (175) configured to magnetically couple to an at least two magnets (290) affixed to the lower tray inner bottom surface (245) at the lower tray back edge (125) to secure closure of the upper tray (150) to the lower tray (105).

16. The one-piece floorboard storage compartment (100) of claim 1 further comprising an at least one floorboard affixment port (295) to affix the one-piece floorboard storage compartment (100) to the floorboard basin (A).

17. The one-piece floorboard storage compartment (100) of claim 1 wherein the lower tray bottom outer surface (110) comprises a waterproof and wear resistant material (205).

18. The one-piece floorboard storage compartment (100) of claim 1 wherein the upper tray outer surface (180) comprises a waterproof and wear resistant material (205).

19. The one-piece floorboard storage compartment (100) of claim 1 wherein the upper tray left side (165) comprises a curved lateral profile and the upper tray right side (170) comprises a curved lateral profile.

20. The one-piece floorboard storage compartment (100) of claim 1 wherein an at least one separation support (230) supports and separates the upper tray (150) at a distance of at least one-half inch but not more than five inches above the lower tray inner bottom surface (245).

\* \* \* \* \*